(12) United States Patent
Coni et al.

(10) Patent No.: US 9,268,436 B2
(45) Date of Patent: Feb. 23, 2016

(54) MULTI-TOUCH TOUCH-SENSITIVE DEVICE WITH MULTI-FREQUENCY CAPACITIVE DETECTION COMPRISING MEANS OF FAULT DETECTION

(71) Applicant: THALES, Neuilly sur Seine (FR)

(72) Inventors: Philippe Coni, Saint Jean d'Illac (FR); Jean-Christophe Abadie, Biganos (FR); Yves Sontag, Bordeaux (FR)

(73) Assignee: Thales, Neuilly sur Seine (FR)

( * ) Notice: Subject to any disclaimer, the term of this patent is extended or adjusted under 35 U.S.C. 154(b) by 5 days.

(21) Appl. No.: 14/255,905

(22) Filed: Apr. 17, 2014

(65) Prior Publication Data

US 2014/0313163 A1 Oct. 23, 2014

(30) Foreign Application Priority Data

Apr. 19, 2013 (FR) ...................................... 13 00929

(51) Int. Cl.
*G06F 3/044* (2006.01)
*G06F 3/041* (2006.01)

(52) U.S. Cl.
CPC .............. *G06F 3/0416* (2013.01); *G06F 3/044* (2013.01); *G06F 3/0418* (2013.01); *G06F 2203/04104* (2013.01)

(58) Field of Classification Search
CPC ..... G06F 3/041; G06F 3/0416; G06F 3/0418; G06F 3/044; G06F 2203/04104
USPC ................................................. 345/173, 174
See application file for complete search history.

(56) References Cited

U.S. PATENT DOCUMENTS

2009/0250268 A1* 10/2009 Staton et al. ................ 178/18.06
2012/0007829 A1* 1/2012 Zhang et al. ................... 345/174
2012/0187954 A1 7/2012 Hsu

FOREIGN PATENT DOCUMENTS

| EP | 2 464 008 A1 | 6/2012 |
| EP | 2 535 793 A1 | 12/2012 |
| FR | 2 952 730 A1 | 5/2011 |

OTHER PUBLICATIONS

Philippe Coni, et al., "31.2: Eliminating Ghost Touches on a Self-Capacitive Touch-Screen," XP055093846, SID Symposium Digest of Technical Papers, vol. 43, No. 1, pp. 411-414 (Jun. 1, 2012).
French Search Report for French Counterpart Application No. FR 1300929, 9 pgs. (Dec. 26, 2013).

* cited by examiner

*Primary Examiner* — Nathan Danielsen
(74) *Attorney, Agent, or Firm* — Blakely, Sokoloff, Taylor & Zafman LLP

(57) ABSTRACT

The general field of the invention is that of touchscreen devices with projected capacitive detection comprising a touch-sensitive matrix panel comprising a plurality of conductive rows and conductive columns, said panel being connected to electronic control means. The electronic control means generate two periodic transmission voltages transmitted at two different frequencies. Analysis of the reception voltages is used to determine the positions of presses on the touch-sensitive panel, including when a row or column is cut. Pressing on a cut row or column is basically determined by calculating the barycenters of 'virtual' hollows in the reception voltages corresponding to this cut row or column.

4 Claims, 5 Drawing Sheets

MULTI-TOUCH TOUCH-SENSITIVE DEVICE WITH MULTI-FREQUENCY CAPACITIVE DETECTION COMPRISING MEANS OF FAULT DETECTION

BACKGROUND OF THE INVENTION

1. Field of the Invention

The field of the invention is that of touch-sensitive or 'touchscreen' surfaces with capacitive detection and more particularly 'multi-touch' touch-sensitive surfaces for detecting two simultaneous presses. This function is essential for 'zooming' or image rotation, for example. The more specific field of the invention is that of detecting faults on said touch-sensitive surface. This invention can be applied to different uses but is particularly well suited to the constraints of the field of aeronautics and aircraft instrument panels where detecting malfunctions is essential for ensuring flight safety.

2. Description of the Prior Art

'Projected' capacitive detection consists in implementing a detection matrix composed of conductive rows and columns arranged so as to detect local variations in capacitance introduced by the proximity of the user's fingers or any other conductive pointing object. 'Projected capacitive' technology comes in two main variants, which are:

'Self capacitive' detection which consists in reading the rows then the columns of the matrix touch network;

'Mutual capacitive' detection consisting in reading each intersection of the matrix touch network.

'Mutual capacitive' technology requires reading the entire panel.

Thus, if the matrix comprises N rows and M columns, N×M acquisitions must be made, making it problematic to implement large, high resolution panels with low response times. In addition, the ability to measure in 'Mutual capacitance' is weaker than that obtained in 'Self capacitive' detection, which makes it problematic for the user to use gloves.

The advantage of 'Self capacitive' detection is that, for the preceding panel, the system requires only N+M acquisitions for reading the matrix. FIG. 1 illustrates this principle. In this FIG. 1, a first finger is pressing on a first intersection of column $C_I$ and row $L_J$ and a second finger is pressing on a second intersection of column $C_K$ and row $L_L$. The output voltages $V_{OUT}$ of the rows and columns display easily identifiable drops in level. Measurements of the voltages around each drop in level can be used to accurately identify the rows and columns required.

However, this latter technique has a drawback. This is because the press or presses is/are detected with the aid of a network of conductive and transparent rows and columns incorporated into a glass substrate. The loss of a row or column creates an unusable dead zone. This defect is all the more serious in that it appears only when the user needs to use the dead zone. It is therefore a dormant fault undetected by the system. In a product intended for mass consumer applications, such as a touch pad, this defect is not necessarily very troublesome, but on the other hand, it becomes very serious in certain technical fields such as aeronautics where the requirements of reliability are very important and in which it is essential to ensure the availability of the system at least until the end of the flight or mission.

This technique has another drawback. It is not always easy to assign the rows and columns detected to the correct intersections actually touched by the user's fingers. Possible intersections not actually touched are generally called 'ghosts'. For countering this last difficulty, the applicant has developed a technique consisting in performing a scan of the matrix at two different acquisition frequencies. This technique is described in the publication 'Eliminating Ghost Touches on a Self-Capacitive Touch-Screen' that appeared in 'SID 2012 DIGEST' of June 2012.

SUMMARY OF THE INVENTION

The subject matter of the invention is the setting up of appropriate means for detecting rows or columns in a 'Self-capacitive' detection device using the principle of scanning the matrix at two different acquisition frequencies. More precisely, the invention relates to a touchscreen device with projected capacitive detection comprising a touch-sensitive matrix panel comprising a plurality of conductive rows and conductive columns, said panel being connected to electronic control means generating, for each conductive row and column, transmission voltages and electronic means of reception and analysis of the reception voltages originating from each conductive row and column, the electronic control means generating, for each conductive row and column, a first periodic transmission voltage transmitted at a first frequency denoted as the working frequency and a second periodic transmission voltage transmitted at a second frequency denoted as the discrimination frequency, different from the first frequency:

in the absence of any press, the value of the working frequency being sufficiently low to cause very small variations in the reception voltages at this working frequency and the value of the discrimination frequency being sufficiently high to cause significant variations in the reception voltages according to the rows and columns at this discrimination frequency;

the reception means being arranged so as to determine, for each row and for each column, the value of a first reception voltage at the working frequency and the value of a second reception voltage at the discrimination frequency;

characterized in that said electronic analysis means comprise:

a table of stored values of the reception voltages at the working frequency of each row and each column in the absence of any press;

comparison means establishing, for each row and for each column, the differences between the measured values of the reception voltages and the stored values of the reception voltages so as to determine whether the measured differences are representative of a cut row or column and/or a press on an intact row or column.

Advantageously, the analysis means comprise first analysis means arranged so that:

if the reception voltages of the set of rows display a 'hollow' representative of a press and the reception voltages of the set of columns do not display a 'hollow' representative of a press, a column is diagnosed as cut, the positions of said faulty column and of the press being determined by measuring the differences in reception voltage taken at the working frequency and at the discrimination frequency of the rows located at said press; and if the reception voltages of the set of columns display a 'hollow' representative of a press and the reception voltages of the set of rows do not display a 'hollow' representative of a press, a row is diagnosed as cut, the positions of said faulty row and of the press being determined by measuring the differences in reception voltage taken at the working frequency and at the discrimination frequency of the columns located at said press.

Advantageously, the analysis means comprise:
second analysis means for calculating, in the event of detecting a cut row or column, on the basis of the values of reception voltages at the working frequency and at the discrimination frequency of the rows or columns situated in the vicinity of the cut row or column, the virtual voltage values obtained if the row or if the column was intact, said virtual values giving 'virtual hollows' in voltage;
third analysis means for calculating the barycentre of the 'virtual hollow' in voltage;
fourth analysis means for determining, on the basis of knowledge of said barycentre, the exact position of the press.

Advantageously, the working frequency is between 100 kHz and 500 kHz and the discrimination frequency is between 500 kHz and 5 MHz.

BRIEF DESCRIPTION OF THE DRAWINGS

The invention will be better understood and further advantages will become apparent upon reading the following description given non-restrictively and thanks to the attached figures of which.

DETAILED DESCRIPTION

The touchscreen device with projected capacitive detection according to the invention comprises an electronic device for scanning the matrix of rows and columns at two different acquisition frequencies. This scanning technique is described in the publication already cited, 'Eliminating Ghost Touches on a Self-Capacitive Touch-Screen' that appeared in 'SID 2012 DIGEST'.

Figure 1:
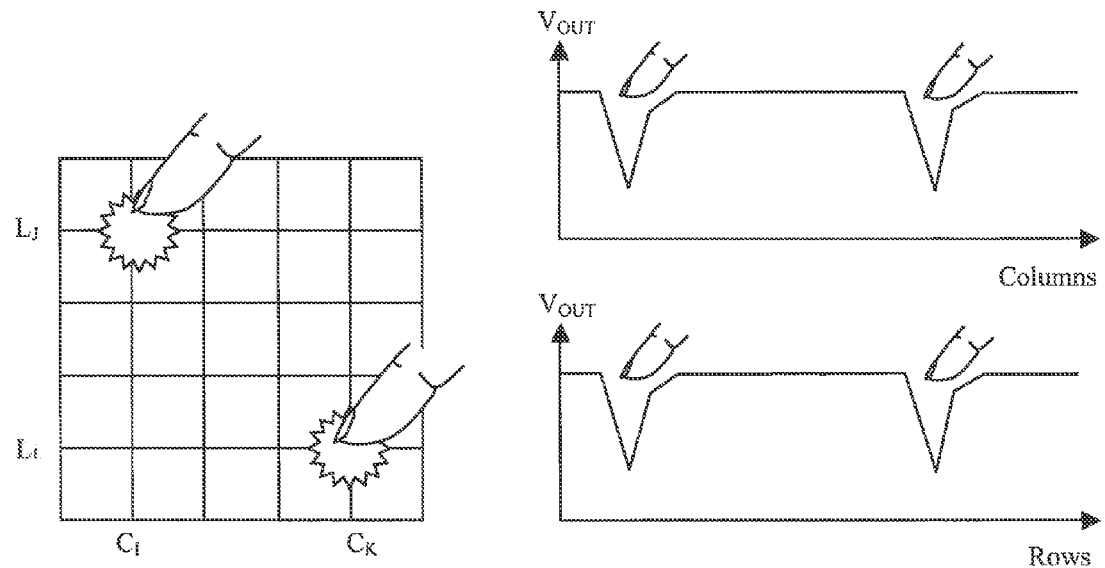
FIG. 1 shows the general operation of a 'Self capacitive' touch-sensitive panel in the case of two distinct presses.
Figure 2:
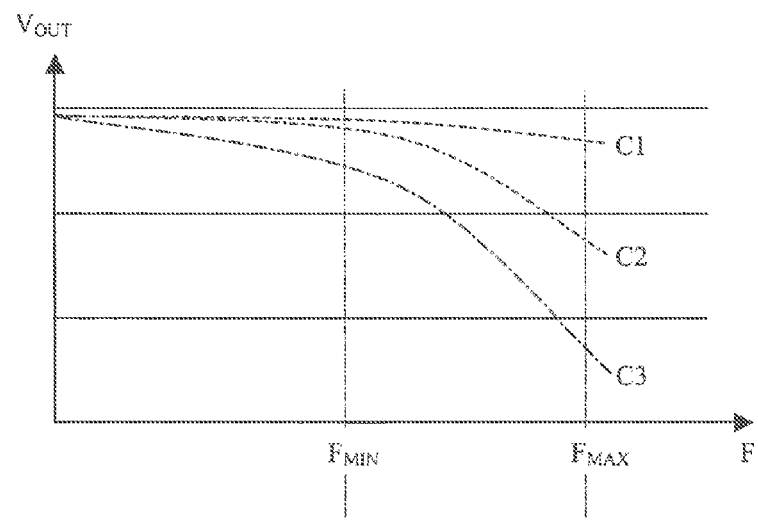
FIG. 2 shows, as a function of the applied frequency, the variation in the output signal of a row or column for three different press positions in a device according to the prior art.
Figure 3:
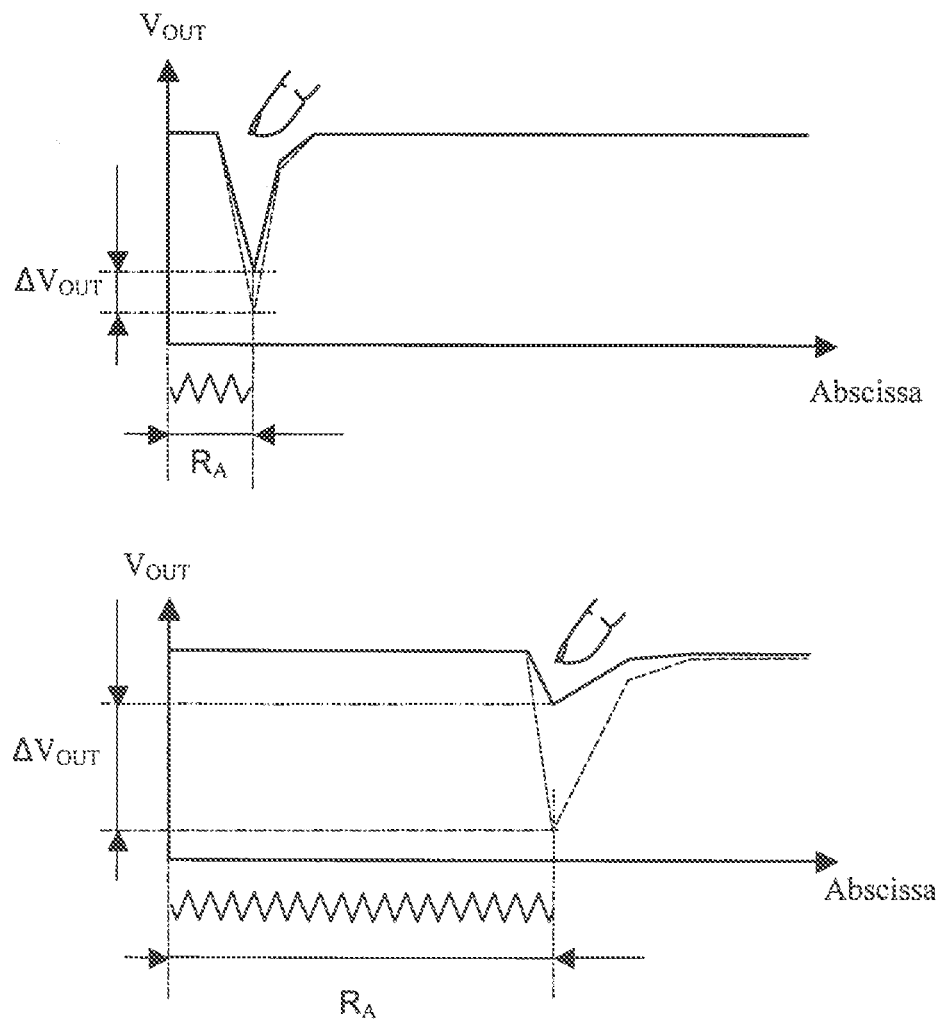
FIG. 3 shows, for two different frequencies, the variations in the output signal of a row or column according to the position of the press in a device according to the prior art.

This technique is shown in FIGS. 2 and 3. The touchscreen comprises a network of conductive rows L and columns C. In what follows, conductive row or column is understood to mean not only the resistive rows located under the touch-sensitive panel, but also the electrical connections that connect these resistive rows to the electronic control devices. These electrical connections are generally mounted on flexible printed circuits called 'flex' circuits.

Each row L and each column C has a length l of electrical resistance R. Thus there is a resistance $R_A$ between one end of the row and a contact point A. The resistance $R_A$ is less than R. This resistance value modifies the output voltage $V_{OUT}$ when the row or column is scanned where the contact point occurs. Each row and each column may be treated initially as part of a network RC of which the resistance R associated with the capacitance $C_d$ of the coupling between the finger and the matrix forms a first order low pass filter. FIG. 2 shows, as a function of the applied frequency, the variation in the output signal $V_{OUT}$ of a row for three different press positions, the first curve C1 for a press located at the side of a row, the second C2 for a press in the middle of a row, the third curve C3 for a press at the end of a row. The scale of FIG. 2 is logarithmic on both axes. There is then, as seen in FIG. 2, a frequency $F_{MIN}$ such that variations in $R_A$ cause a minimum variation of $V_{OUT}$ whatever the position of the press. Conversely, there is a frequency $F_{MAX}$ such that variations in $R_A$ cause a significant attenuation of $V_{OUT}$ according to the position of the press. Thus, at this frequency $F_{MAX}$, by measuring this attenuation, it is then easy to discover the value of the resistance $R_A$ and therefore, to determine the position of the contact point on the row.

FIG. 3 shows the variations in the output signal $V_{OUT}$ for frequencies $F_{MIN}$ and $F_{MAX}$ along a conductive row according to the position of the press. This FIG. 3 comprises two graphs. The top graph shows the variations at the start of a row. The bottom graph shows the variations in the output signal $V_{OUT}$ at the end of a row. In FIG. 3, the curves shown in dotted lines represent variations in the $V_{OUT}$ signal at frequency $F_{MAX}$ and the curves shown in continuous lines represent variations in the $V_{OUT}$ signal at frequency $F_{MIN}$. By measuring $V_{OUT}$ at the two frequencies $F_{MIN}$ and $F_{MAX}$, information is obtained on the value of the resistance $R_A$ of the row which is used to determine the position of the contact point on the row and therefore the required column, enabling the press to be fully located.

Figure 4:
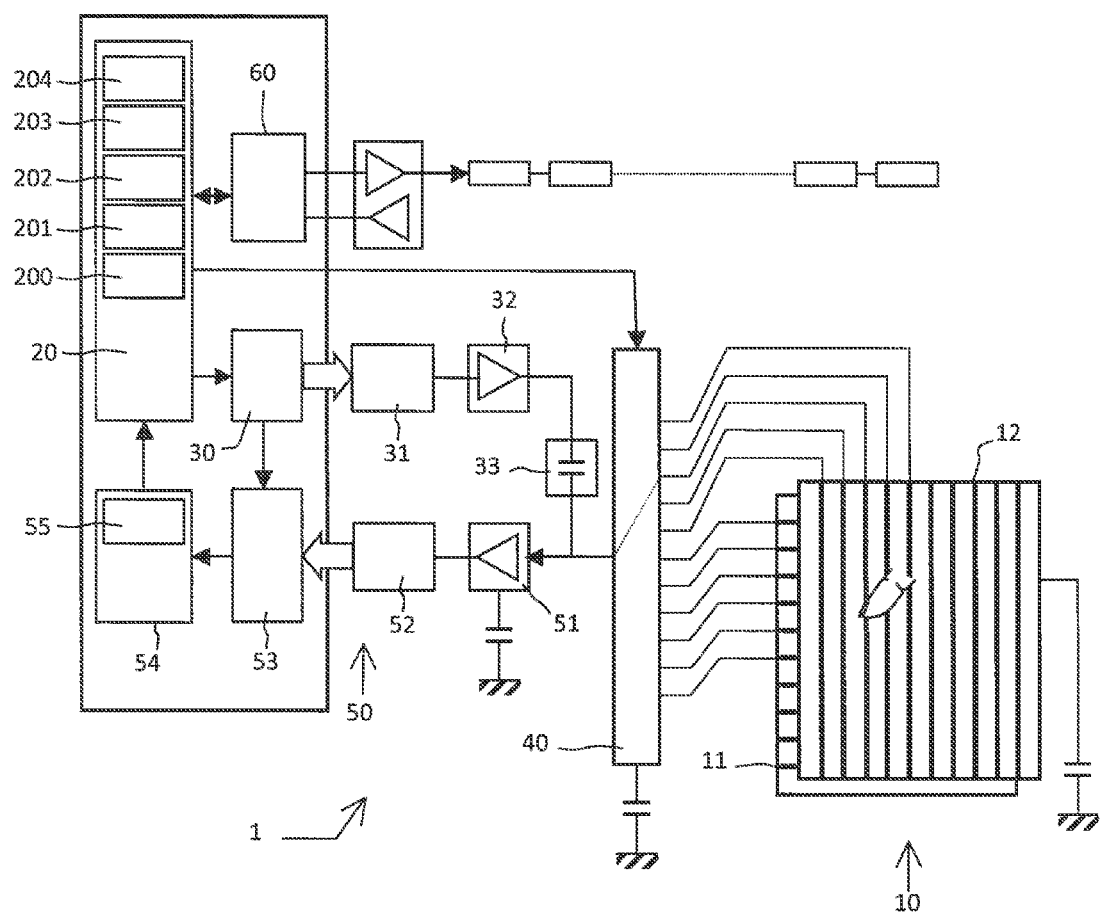
FIG. 4 shows the synoptic view of a projected capacitive touch-sensitive device according to the invention.

By way of non-restrictive example, FIG. 4 shows a touch-sensitive panel device 1 with projected capacitive detection. It basically comprises:
a touch-sensitive panel 10 comprising a first substrate comprising a first series of conductive rows 11 parallel to each other and a second substrate comprising a second series of conductive columns 12 parallel to each other;
means of control and analysis 20 of the various transmission and reception signals necessary for the operation of the touch-sensitive device;
A high frequency variable frequency sine wave generator 30 supplying the touch-sensitive panel in alternating voltages $V_{IN}$ via a digital-to-analogue converter 'DAC' 31, an amplifier 32 and an injection capacitor 33. Typically, the frequencies are between a few hundred kHz and a few MHz;
A multiplexer 40. It applies the input voltage $V_{IN}$ successively to each column 12 then to each row 11 of the touch-sensitive panel 10 and directs each output voltage $V_{OUT}$ corresponding to an applied voltage $V_{IN}$ to an electronic processing chain 50;
An electronic processing chain 50 which comprises a buffer memory or 'buffer' 51, an analogue-to-digital converter or ADC 52, a synchronous demodulator 53 connected to the frequency generator 30 and electronic filtering means 54. The filtered signals are sent to the analysis means 20;
Transmission-reception means 60 or 'UART' meaning 'Universal Asynchronous Receiver Transmitter' which ensures the retransmission of signals processed by the analysis means 20 towards the outside which is generally a display device coupled with the touch-sensitive panel and which displays information that it is desired to control, modify or validate.

The device operates as follows. In nominal mode, the rows and columns of the panel are continuously and successively scanned by an input voltage $V_{IN}$ at a first working frequency $F_{MIN}$ and at a second 'discrimination frequency' $F_{MAX}$. This voltage is generated by the electronic assembly composed of means 30, 31, 32 and 33.

In the absence of any approaching hand, the touch-sensitive controller continuously creates an image of the panel at frequency $F_{MIN}$ and deduces therefrom an impedance table at rest via sliding average. This image is subtracted from the table 55 of the instantaneous values of impedances to form the difference table, from which it is possible to assign the status of each point of intersection. This method is partly described in the patent EP 0 567 364 entitled 'Process for operating a capacitive tactile keyboard'.

When there is a press represented symbolically by a finger in FIG. 4 and according to the position of this press, a certain capacitance is created between the contact point and the ground, this capacitance being mainly connected via a resistance of rows and columns to the multiplexer 40.

This resistive and capacitive component will cause a variation in the total impedance Z of the system, and act on the output signal $V_{OUT}$ which equals $Z.V_{IN}$ with $Z=A+Bj$. The signal $V_{OUT}$ is then demodulated by the electronic chain 50 in order to extract the effective value $V_{OUT}=Z.V_{IN}$, with $Z=A+Bj$ and $j=\sin(2\pi.F.t)$ by means of a synchronous demodulator 53. The synchronous demodulation is used to filter electromagnetic interference 'EMI' by acting as a bandpass filter with a high quality factor, which avoids the use of not very selective passive filters.

At least two measurements are made, one at the working frequency $F_{MIN}$, and one at the discrimination frequency $F_{MAX}$. For large size panels, several discrimination frequencies $F_{MAX}$ may be used. Advantageously, the frequencies $F_{MIN}$ and $F_{MAX}$ are modulated and demodulated separately by means of two synchronous demodulators 53, enabling the values of capacitance C and resistance R, representative of the position of the press, to be obtained in a single measurement.

Finally, the filtered continuous signal originating from the demodulator 53 is filtered by means of the filtering 54.

If the touch-sensitive panel is intact, i.e. If all the rows and all the columns are intact, during a single press, the row and column position thereof is calculated from a weighted barycentre around the row signal and the column signal of maximum deviation, the doublet of points giving the coordinate of the press.

In the case of aligned multiple presses, the common row or column is calculated in the same way, the triplet of points giving the coordinates of the two presses.

In the case of non-aligned multiple presses, the quadruplet of points is measured at frequency $F_{MIN}$, then at frequency $F_{MAX}$. The variation in the signal resulting from the variation in frequency is used for determining the rejection of the ghost and the quadruplet of points gives the coordinates of the different presses.

Figure 5:
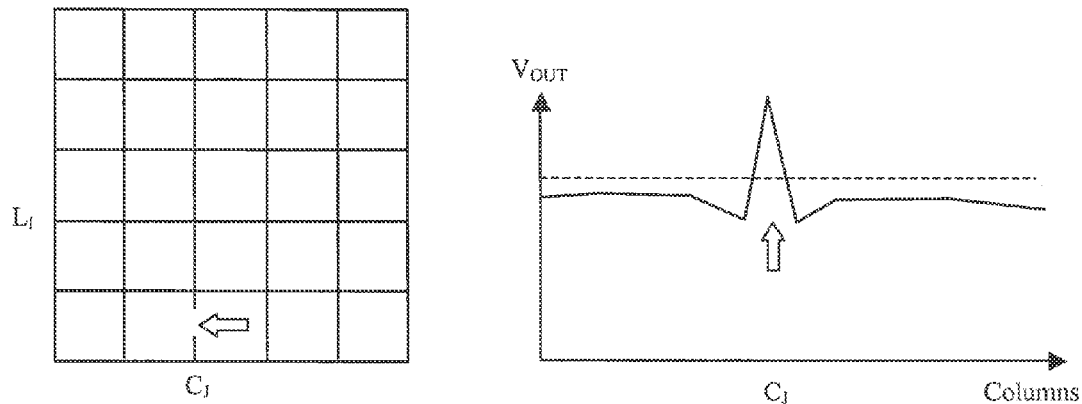
FIG. 5 shows the variation in output voltage in the absence of any press and in the presence of a cut column.

When a row or column is cut, even in the absence of any press, the output voltage $V_{OUT}$ at the cut row or column is disrupted in so far as the capacitive mutual coupling between this defective row or column and the rows or columns which intersect it has disappeared. FIG. 5 illustrates this variation in voltage. Row $C_J$ is cut. The voltage $V_{OUT}$ has a peak at this row. The device according to the invention comprises comparison means 200 establishing, for each row and for each column, the differences between the measured values of the reception voltages and the stored values of the reception voltages in the table 55 so as to determine whether the measured differences are representative of a cut row or column. A constant threshold may be set beyond the stored value in order to take into account the normal drifts and dispersions of the signal in time and the measurement noise. Thus, by this means, the system determines the defective row or column. It is assumed, of course, that the row or column is cut after the reception voltages are stored in the table 55, which generally takes place before the operational implementation of the touch-sensitive panel or when a test is initiated. This information will be then be confirmed at the time of a press on the cut row or column.

Figure 6:
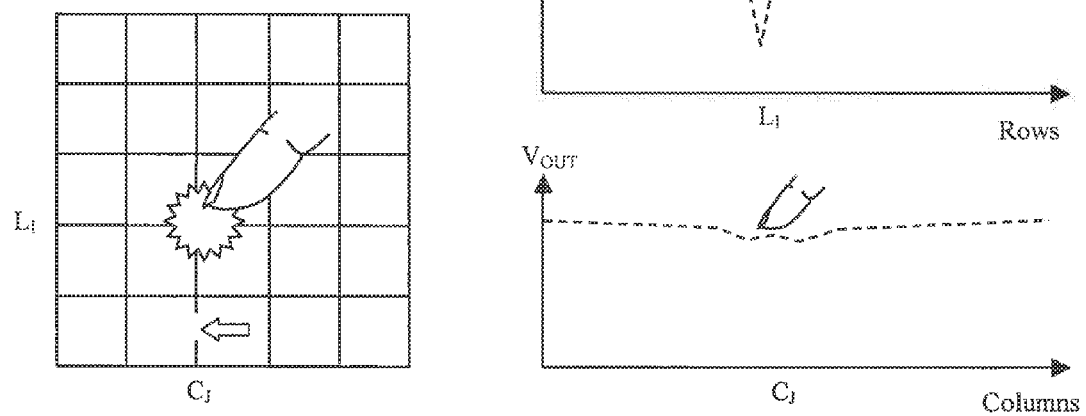
FIG. 6 shows the operation of a 'Self capacitive' touch-sensitive panel in the case of a press on a cut column.

When a row or column is cut, if a press occurs at this row or column, the voltage $V_{OUT}$ concerned is disrupted. By way of example illustrated in FIG. 6, the screen comprises a touch-sensitive matrix panel composed of conductive rows L and conductive columns C. The user places his finger in the vicinity of the intersection of row $L_I$ and column $C_J$. Column $C_J$ is cut and row $L_I$ is intact. In this case, the voltage $V_{OUT}$ of the rows is normal and has a hollow at row $L_I$ as seen in FIG. 6. On the other hand, since column $C_J$ is cut, the voltage $V_{OUT}$ of the columns has only a slight variation at the cut column.

Figure 7:
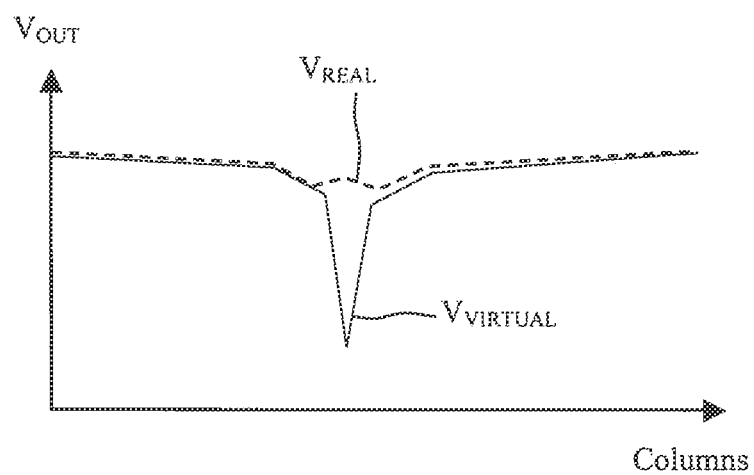
FIG. 7 shows the principle of correcting the voltage values of a faulty row or column according to the invention.

Also, the touchscreen device according to the invention has additional analysis and digital signal processing means for dealing with this problem of a row or column being cut. They are shown in FIG. 4 by references 201, 202, 203 and 204. They basically comprise:

first analysis means 201 arranged so that:
if the reception voltages of the set of rows display a 'hollow' representative of a press and the reception voltages of the set of columns do not display a 'hollow' representative of a press, a column is diagnosed as cut, the positions of said faulty column and of the press being determined by measuring the differences in reception voltage taken at the working frequency and at the discrimination frequency of the rows located at said press; and
if the reception voltages of the set of columns display a 'hollow' representative of a press and the reception voltages of the set of rows do not display a 'hollow' representative of a press, a row is diagnosed as cut, the positions of said faulty row and of the press being determined by measuring the differences in reception voltage taken at the working frequency and at the discrimination frequency of the columns located at said press.

second analysis means 202 for calculating, in the event of detecting a cut row or column, on the basis of the values of reception voltages at the working frequency and at the discrimination frequency of the rows or columns situated in the vicinity of the cut row or column, the virtual voltage values obtained if the row or if the column was intact, said virtual values giving 'virtual hollows' in voltage. This reconstruction is based on knowledge of a part of the voltage signals delivered by the rows or columns in the immediate vicinity of the cut row or column and on knowledge of the theoretical signal generated by a press on an intact row or column located at the site of the defective row or column. FIG. 7 shows the result of this analysis. The dotted line curve shows the variations in the voltage $V_{REAL}$ in the presence, for example, of a cut column. The thin line curve shows the reconstructed 'virtual' variation in the voltage $V_{VIRTUAL}$ of the columns in the case of said cut column;

third analysis means 203 for calculating the barycentre of the 'virtual hollow' in voltage;

fourth analysis means 204 for determining, on the basis of knowledge of said barycentre, the exact position of the press.

As can be seen, the electronic means implemented in the touch-sensitive device according to the invention are simple and effectively solve not only the main problems of projected capacitive detection, i.e. the detection of ghost presses, insensitivity to external electromagnetic interference due to synchronous detection, the absence of interference from the electronic environment through the use of pure sine wave signals without harmonics, but also the detection of cut rows and the reconstruction of a clean virtual signal when this detection is proven.

What is claimed is:

1. A touchscreen device with projected capacitive detection comprising a touch-sensitive matrix panel comprising a plurality of conductive rows and conductive columns, said panel being connected to electronic control means generating, for each conductive row and column, transmission voltages and electronic means of reception and analysis of reception voltages originating from each conductive row and column, the electronic control means generating, for each conductive row and column, a first periodic transmission voltage transmitted at a first frequency denoted as a working frequency and a second periodic transmission voltage transmitted at a second frequency denoted as a discrimination frequency, different from the first frequency:

in an absence of any press, a value of the working frequency being sufficiently low to cause very small variations in the reception voltages at the working frequency and a value of the discrimination frequency being sufficiently high to cause significant variations in the reception voltages according to the rows and columns at the discrimination frequency;

the reception and analysis means being arranged so as to determine, for each row and for each column, a value of a first reception voltage at the working frequency and a value of a second reception voltage at the discrimination frequency;

wherein said electronic analysis means comprises:
a table of stored values of the reception voltages at the working frequency of each row and of each column in the absence of any press;
comparison means establishing, for each row and for each column, differences between measured values of the reception voltages and the stored values of the reception voltages so as to determine whether measured differences are representative of a cut row or column and/or a press on an intact row or column;
first analysis means arranged so that:
if the reception voltages of a set of rows display a hollow representative of a press and the reception voltages of a set of columns do not display a hollow representative of a press, a column is diagnosed as cut, and positions of a faulty column and of the press being determined by measuring the differences in reception voltage taken at the working frequency and at the discrimination frequency of the rows located at said press;
if the reception voltages of the set of columns display a hollow representative of a press and the reception voltages of the set of rows do not display a 'hollow' representative of a press, a row is diagnosed as cut, and positions of a faulty row and of the press being determined by measuring the differences in reception voltage taken at the working frequency and at the discrimination frequency of the columns located at said press.

2. The touchscreen device according to claim 1, wherein the analysis means comprise:
second analysis means for calculating, in response to detecting a cut row or column, based on the values of reception voltages at the working frequency and at the discrimination frequency of the rows or columns situated in a vicinity of the cut row or column, wherein virtual voltage values are obtained if the row or if the column was intact, said virtual values giving virtual hollows in voltage;
third analysis means for calculating a barycentre of the virtual hollow in voltage; and
fourth analysis means for determining, based on knowledge of said barycentre, an exact position of the press.

3. The touchscreen device according to claim 2, wherein the working frequency is between 100 kHz and 500 kHz and in that the discrimination frequency is between 500 kHz and 5 MHz.

4. The touchscreen device according to claim 1, wherein the working frequency is between 100 kHz and 500 kHz and in that the discrimination frequency is between 500 kHz and 5 MHz.

* * * * *